US008376427B2

(12) United States Patent
Perarnau Ramos et al.

(10) Patent No.: US 8,376,427 B2
(45) Date of Patent: Feb. 19, 2013

(54) ENERGY ABSORBER FOR A BUMPER ASSEMBLY OF A VEHICLE AND METHOD FOR THE MANUFACTURE THEREOF

(75) Inventors: Francesc Perarnau Ramos, Barcelona (ES); Toni Cabrera Ortega, Barcelona (ES); Isabel Carcia Bonilla, Barcelona (ES)

(73) Assignee: Autotech Engineering A.I.E., Abadiano (Bizkaia) (ES)

( * ) Notice: Subject to any disclaimer, the term of this patent is extended or adjusted under 35 U.S.C. 154(b) by 210 days.

(21) Appl. No.: 12/770,789

(22) Filed: Apr. 30, 2010

(65) Prior Publication Data
US 2011/0198873 A1 Aug. 18, 2011

Related U.S. Application Data

(63) Continuation-in-part of application No. PCT/ES2007/000561, filed on Nov. 2, 2007.

(51) Int. Cl.
*B60R 19/34* (2006.01)
(52) U.S. Cl. ............... 293/133; 293/132; 296/187.03
(58) Field of Classification Search ............... 293/120, 293/133, 154, 155; 296/187.09, 203.02, 296/203.03, 193.05, 130; 29/525.14; 72/379.6, 72/385
See application file for complete search history.

(56) References Cited

U.S. PATENT DOCUMENTS

| | | | | |
|---|---|---|---|---|
| 4,410,208 A * | 10/1983 | Mulso et al. | ............... | 293/132 |
| 4,684,151 A * | 8/1987 | Drewek | .................. | 280/784 |
| 5,876,077 A * | 3/1999 | Miskech et al. | ............... | 293/132 |
| 5,876,078 A * | 3/1999 | Miskech et al. | ............... | 293/133 |
| 6,460,667 B1 * | 10/2002 | Bruck et al. | ............... | 188/371 |
| 6,588,830 B1 * | 7/2003 | Schmidt et al. | ............... | 296/187.09 |
| 7,651,155 B2 * | 1/2010 | Tan et al. | ............... | 296/187.03 |
| 7,793,996 B2 * | 9/2010 | Karlander | ............... | 293/133 |
| 7,896,411 B2 * | 3/2011 | Kano et al. | ............... | 293/133 |
| 8,020,906 B2 * | 9/2011 | Schmid et al. | ............... | 293/133 |
| 2008/0036242 A1 * | 2/2008 | Glance et al. | ............... | 296/187.09 |

FOREIGN PATENT DOCUMENTS

| | | |
|---|---|---|
| DE | 19959701 A1 | 6/2001 |
| DE | 10256000 A1 | 9/2004 |
| EP | 1762438 A1 | 3/2007 |

OTHER PUBLICATIONS

DE 102 56 000 machine translation attached.*

* cited by examiner

*Primary Examiner* — Dennis Pedder
*Assistant Examiner* — Pinel Romain
(74) *Attorney, Agent, or Firm* — Hess Patent Law Firm; Robert J. Hess

(57) ABSTRACT

An energy absorber for a bumper assembly of a vehicle and a method for the manufacture thereof are described. The absorber includes a tubular body (1) aligned with the longitudinal direction of the vehicle, with a first end (1a) for being joined to the body of the vehicle and a second end (1b) for being joined to a transversely arranged bumper cross-member. The tubular body (1) is made of a single piece of bent sheet metal with two end edges (11, 12) defining the first and second ends (1a, 1b) and two adjacent side edges (13, 14) joined together defining a longitudinal seam (2) extending between the first and second ends (1a, 1b). The method includes providing sheet metal provided with opposite side edges (13, 14) and bending it until the side edges (13, 14) are adjacent to form a tubular body (1) with first and second ends (1a, 1b) defined by the end edges (11, 12) and joining the adjacent side edges (13, 14) together defining a longitudinal seam (2).

8 Claims, 5 Drawing Sheets

ENERGY ABSORBER FOR A BUMPER ASSEMBLY OF A VEHICLE AND METHOD FOR THE MANUFACTURE THEREOF

CROSS-REFERENCE TO COPENDING PATENT APPLICATIONS

This is a continuation-in-part of PCT/ES2007/000561 filed Nov. 2, 2007.

BACKGROUND OF THE INVENTION

1. Technical Field

The present invention generally relates to an energy absorber for a bumper assembly of a vehicle in the form of a one-piece tubular body obtained from bent and welded sheet metal and a method for the manufacture thereof.

2. Discussion of Related Art

Patent EP-1384536 describe an energy absorber comprising a sheet metal semi-finished item that is bent and/or folded to obtain a multi-chamber profile. Before being transformed into said multi-chamber profile, said sheet metal semi-finished item is subjected to transforming processes such as die-cutting and/or embossing/forming. Once the multi-chamber profile is obtained, the ends of said profile are joined together to form said chambers by means of welding, riveting and/or adhesive bonding. In one embodiment, this sheet is bent to obtain a double chamber profile, joining its ends by means of welding, so there must be two welding beads in said joint.

Energy absorbers of the type comprising two U-shaped parts facing one another with the branches overlapping and welded together, such as that described in U.S. Pat. No. 6,474,709, are known on the market. To manufacture these absorbers it is therefore necessary to manufacture two different parts and join them by means of welding in their two facing overlapping areas, which involves a more complicated and more expensive manufacturing process than in the case of the present invention.

Document EP-1762438 discloses a shock absorber for a motor vehicle comprising a tubular hollow body of metal which has a rectangular or square cross-section. The hollow body is open at both ends and is made from a flat metal blank obtained by stamping. The flat metal blank is formed to the polygonal hollow body by angle-bending at longitudinal edges running in the longitudinal direction thereof between each two adjacent side walls, and is closed in the longitudinal direction by a longitudinal welding seam. Longitudinal reinforcing ribs are provided in opposite side walls of the tubular hollow body which are formed in the metal blank during stamping process.

A drawback with the shock absorber of cited document EP-1762438 is that said longitudinal edges between adjacent side walls are straight and continuous, making thus difficult a controlled deformation of the tubular hollow body when subjected to forces in the longitudinal direction. On the other hand, the technique of angle-bending a flat metal blank obtained by stamping prevents the possibility of providing the tubular hollow body with transverse corrugations extending into rounded edges connecting adjacent side walls. Furthermore, the technique of angle-bending a flat metal blank is not appropriate when using very high or ultra high strength steel for the metal blank.

SUMMARY OF THE INVENTION

The present invention aids in solving the aforementioned and other drawbacks by providing an energy absorber for a bumper assembly of a vehicle, of the type comprising a single piece of sheet metal bent and joined together at its ends such that the two side edges are overlapping and joined together, defining a single longitudinal seam extending between its two ends, which fairly simplifies the manufacturing process and makes it more cost-effective, obtaining an energy absorber with similar features as the ones described above, but with a considerable reduction of the manufacturing costs.

The invention is also characterized by a method for the manufacture of an energy absorber for a bumper assembly of a vehicle, which comprises the steps of:

providing a piece of sheet metal provided with opposite end edges and opposite side edges;

longitudinally bending said piece of sheet metal until said side edges are adjacent to form a tubular body with first and second ends defined by said end edges; and joining said adjacent side edges defining a longitudinal seam extending between said first and second ends.

In a preferred embodiment, said method comprises the additional step of deep-drawing said piece of sheet metal before said step of bending, to form corrugations which define transverse grooves in one or more regions of the piece of sheet metal. Said step of deep-drawing furthermore comprises forming:

a corrugated wall in a central region of the piece of sheet metal in which some of said transverse corrugations are formed;

two first planar wall portions extending substantially at right angles from opposite sides of said corrugated wall;

two second planar wall portions extending substantially at acute angles from said two first planar wall portions; and first and second corrugated wall portions in which some of said transverse corrugations are formed, extending substantially at a right angle from said second planar wall portions and ending in the side edges, the corrugated wall and said first and second corrugated wall and planar wall portions being connected by rounded edges.

In turn, said step of bending comprises two stages:

bending the second planar wall portions until placing them at right angles with respect to the first planar wall portions; and bending the second planar wall portions until aligning them with the first planar wall portions to form two opposite planar walls, whereby the first and second corrugated wall portions are aligned or parallel forming a corrugated wall and the side edges are adjacent.

The method of the present invention furthermore comprises an additional step of die-cutting at least one hole in at least one of the second planar wall portions after the first stage and before the second stage of the step of bending.

Finally, in said method the adjacent side edges are overlapping and the step of joining them comprises forming a longitudinal seam by welding arranged along one of the two opposite corrugated walls, extending between said first and second ends of said tubular body.

BRIEF DESCRIPTION OF THE DRAWINGS

The previous and other features and advantages will be more fully understood from the following detailed description of several embodiments with reference to the attached drawings, in which.

DETAILED DESCRIPTION OF EXEMPLARY EMBODIMENTS

FIGS. 1A to 4B show the different steps to which sheet metal is subjected until forming the energy absorber of the present invention.

Figure 1A:
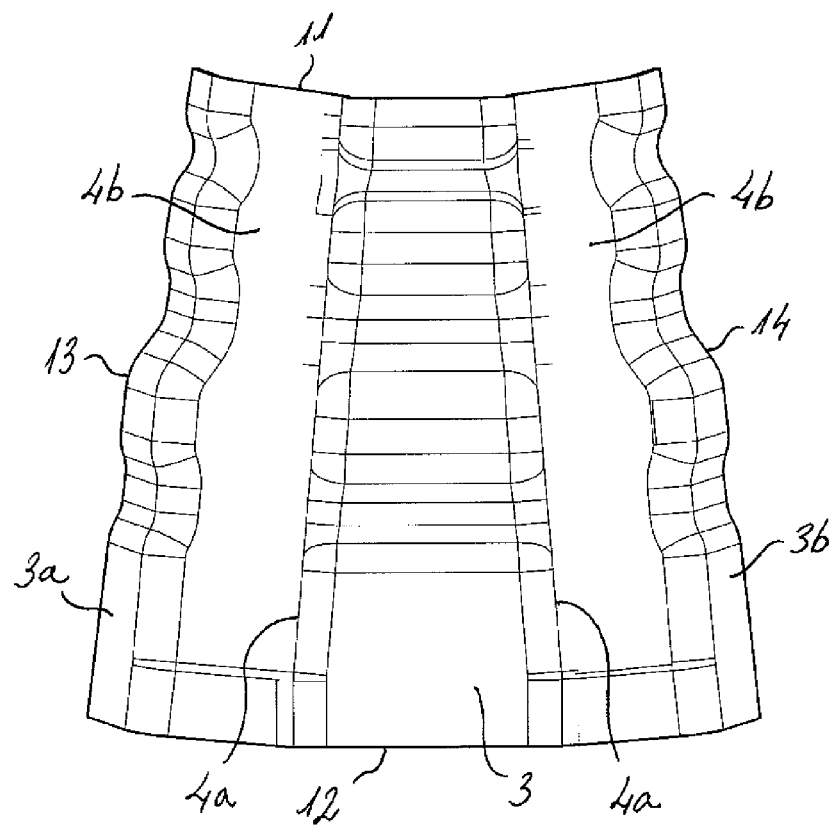
FIGS. 1A and 1B are elevational and plan views, respectively, of the sheet metal once it is deep drawn.
Figure 1B:
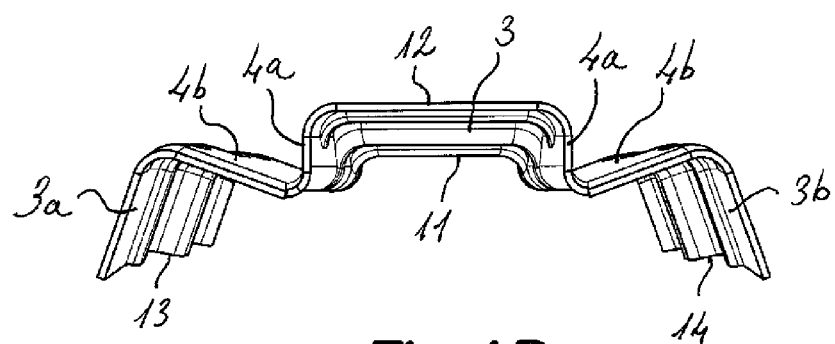

Thus, FIGS. 1A and 1B show a sheet metal in which corrugations 6 have been formed by means of a deep drawing process, which corrugations 6 define transverse grooves arranged transverse to the longitudinal direction of the vehicle. These grooves are made in the part for the purpose of regulating the strength thereof.

Figure 2A:
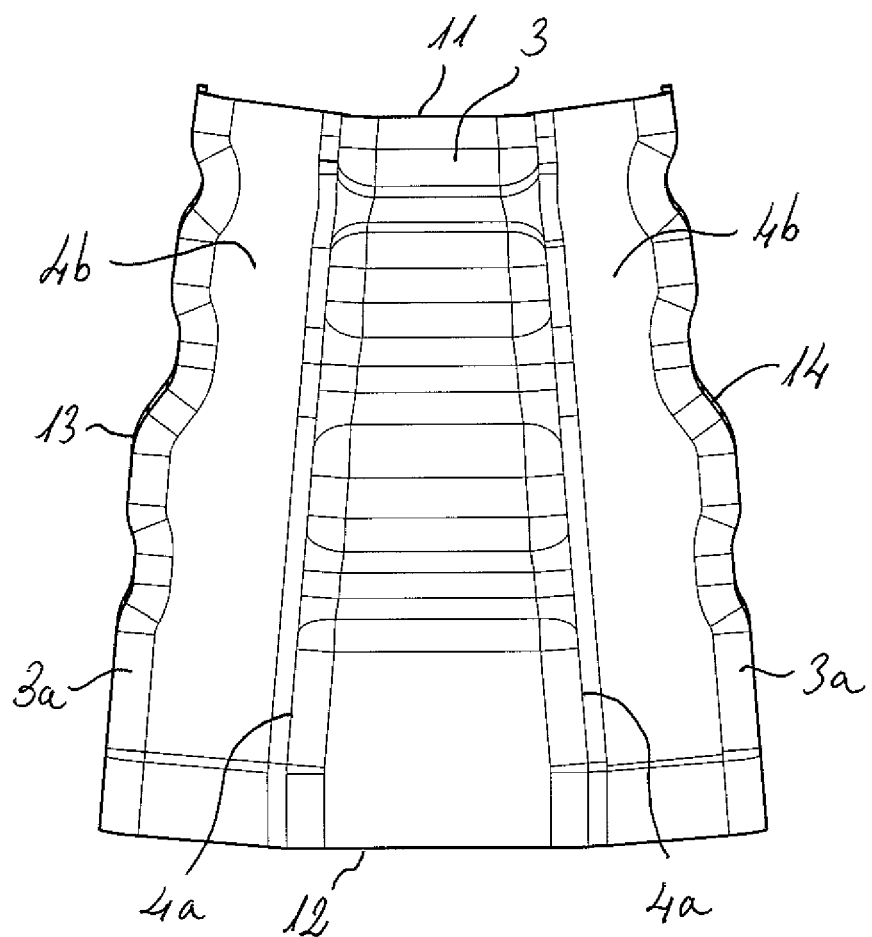
FIGS. 2A and 2B are elevational and plan views, respectively, of the sheet metal once it is deep drawn and after its first stage of bending.
Figure 2B:
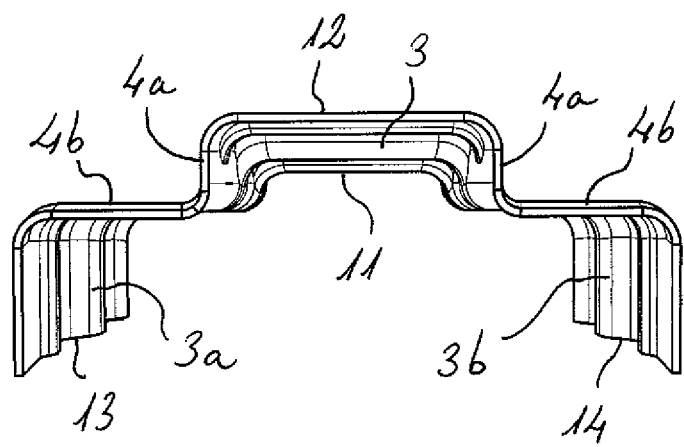

FIGS. 2A and 2B likewise show said deep drawn sheet metal after the first stage of bending, in which second planar wall portions 4b are bent until placing them at right angles with respect to first planar wall portions 4a.

Figure 3:
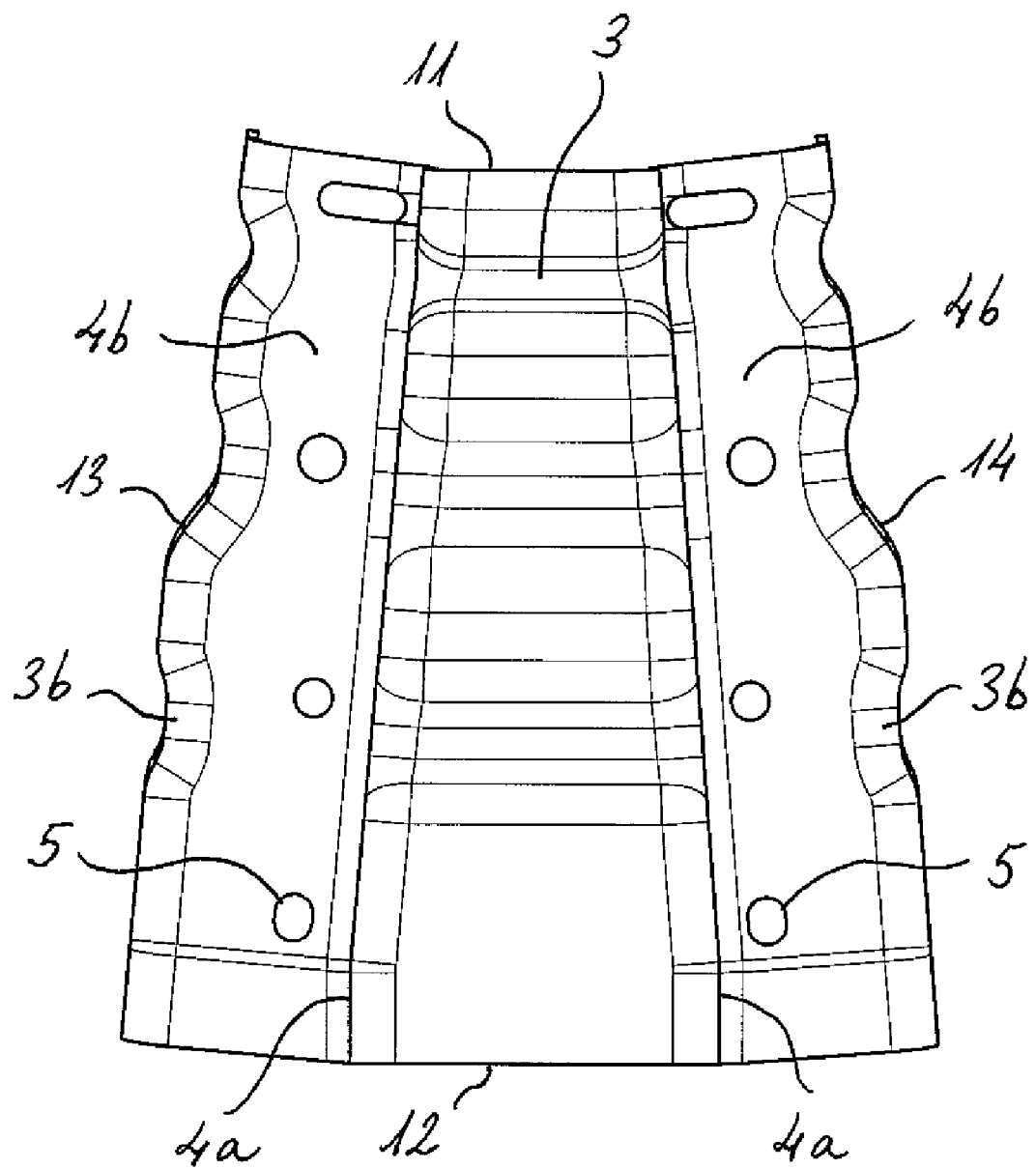
FIG. 3 is a plan view of the deep drawn sheet metal, bent in a first stage and die-cut.

In turn, FIG. 3 shows the same sheet metal of FIG. 2A, but in which four holes have been made in each of its two planar walls by means of a die-cutting process. These holes are made in the part for the same purpose as the grooves, i.e., to adjust the strength of the part to pre-established values, reducing the strength thereof by increasing the number of holes made therein.

Figure 4A:
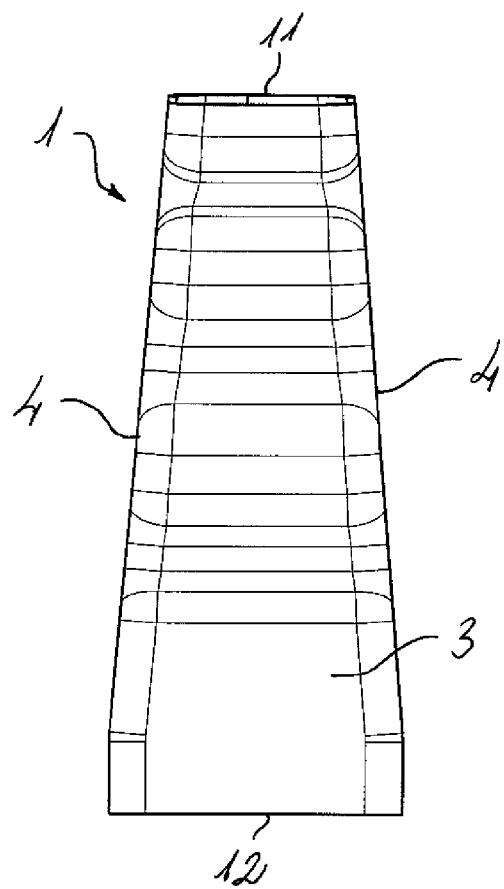
FIG. 4A is an elevational view seen from an end of the absorber once the second stage of bending has been performed.
Figure 4B:
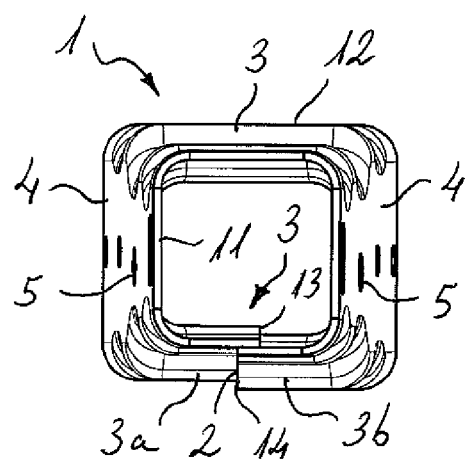
FIG. 4B is a plan view of the absorber after the second stage of bending, seen from the upper part of FIG. 4A as it is shown in the drawing.

FIGS. 4A and 4B show the energy absorber after the second stage of bending. In said FIGS. 4A and 4B, it can be seen that the energy absorber has a substantially quadrangular section with rounded edges 7 and defines four walls opposite one another in twos, in which two of said opposite walls are substantially planar walls 4 and the other two opposite walls are corrugated walls 3 in which said transverse corrugations 6 made in the stage of deep drawing are arranged.

Figure 5:
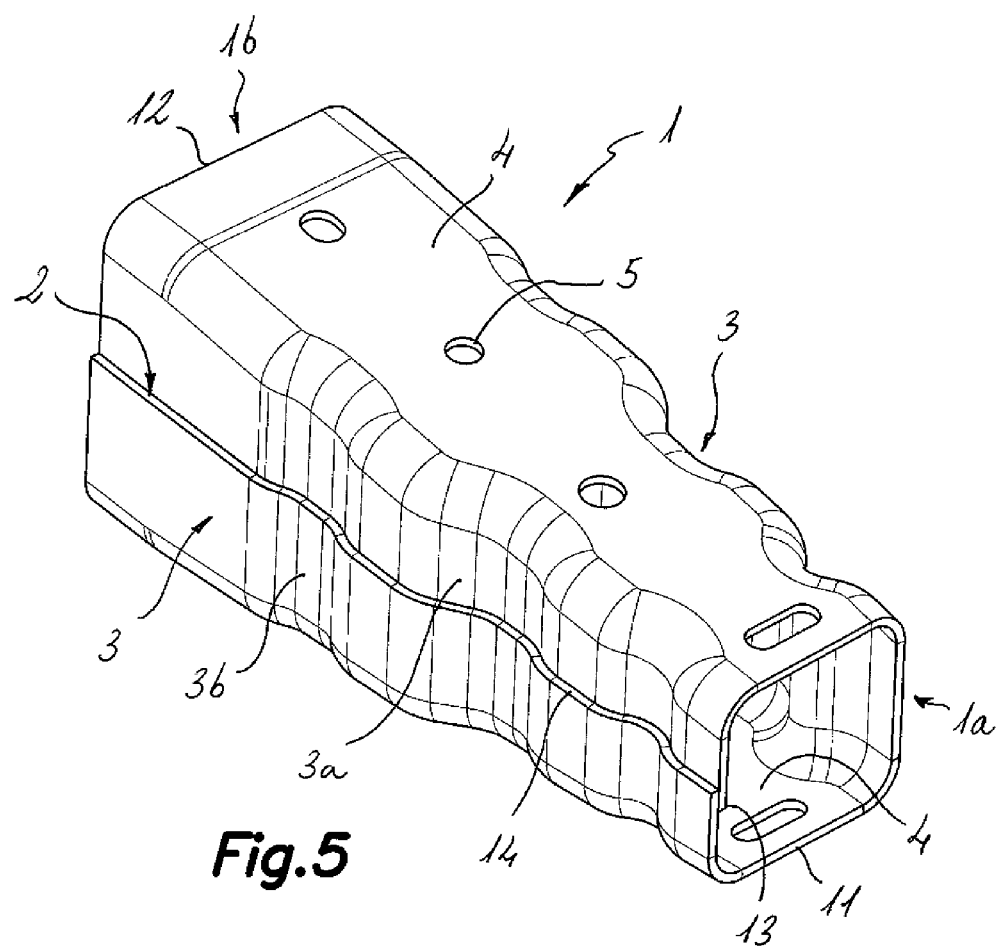
FIG. 5 is a perspective view of the absorber once the manufacturing process has ended.

Finally, FIG. 5 shows a perspective view of the fully formed energy absorber. This energy absorber comprises a tubular body 1 which, in a preferred embodiment, is substantially aligned with the longitudinal direction of the vehicle. Said tubular body 1 has a first end 1a for being joined to the body of the vehicle and a second end 1b for being joined to a bumper cross-member arranged transverse to said longitudinal direction of the vehicle. In said FIG. 5, it can be seen that said tubular body 1 is formed by a single piece of bent sheet metal, which has two end edges 11, 12 defining first and second ends 1a, 1b and two adjacent side edges 13, 14 joined together defining a longitudinal seam 2 extending between said first and second ends 1a, 1b, along one of the two corrugated walls 3 including the transverse corrugations 6.

In one embodiment said two adjacent side edges 13, 14 are overlapping and joined together by a single welding bead.

The tubular body 1 has a substantially quadrangular section with four walls opposite one another in twos. Two of said opposite walls are substantially planar walls 4 and the other two opposite walls are corrugated walls 3 in which transverse corrugations 6 defining transverse grooves arranged transverse to the longitudinal direction of the vehicle are formed.

As shown in FIG. 5, said corrugated walls 3 are connected with said planar walls 4 by rounded edges 7, and said transverse corrugations 6 extend into said rounded edges 7 connecting the corrugated walls 3 and the planar walls 4.

A person skilled in the art will be able to make modifications and variations from the embodiments shown and described without departing from the scope of the present invention as it is defined in the attached claims.

What is claimed is:

1. A method for the manufacture of an energy absorber for a bumper assembly of a vehicle, comprising the steps of:
   providing a piece of sheet metal provided with opposite end edges and opposite side edges;
   deep drawing said piece of sheet metal to form transverse corrugations defining transverse grooves in one or more regions of the piece of sheet metal;
   longitudinally bending said piece of sheet metal until said side edges are adjacent to form a tubular body with first and second ends defined by said end edges; and
   joining said adjacent side edges defining a longitudinal seam extending between said first and second ends,
   characterized in that said step of deep-drawing further comprises the additional step of forming:
   a corrugated wall in a central region of the piece of sheet metal in which some of said transverse corrugations are formed;
   two first planar wall portions extending substantially at right angles from opposite sides of said corrugated wall;
   two second planar wall portions extending substantially at acute angles from said two first planar wall portions;
   first and second corrugated wall portions in which some of said transverse corrugations are formed, extending substantially at right angles from said second planar wall portions and ending in the side edges; and
   rounded edges connecting said corrugated wall with said first planar wall portions and also connecting said second planar wall portions with said first and second corrugated wall portions, with the transverse corrugations extending into said rounded edges.

2. The method according to claim 1, wherein said step of bending comprises bending the second planar wall portions until aligning them with the first planar wall portions to form two opposite planar walls, whereby the first and second corrugated wall portions are mutually aligned and the side edges are adjacent.

3. The method according to claim 1, wherein said step of bending comprises bending the second planar wall portions until aligning them with the first planar wall portions to form two opposite planar walls, whereby the first and second corrugated wall portions are mutually parallel and the side edges are adjacent.

4. The method according to claim 1, further comprising an additional step of die-cutting at least one hole in at least one of the second planar wall portions after the first stage of the step of bending and before the second stage of the step of bending.

5. The method according to claim 1, wherein the adjacent side edges are overlapping and the step of joining them together comprises forming a longitudinal seam by welding arranged along one of the two opposite corrugated walls and extending between said first and second ends of said tubular body.

6. The method according to claim 1, wherein the adjacent side edges are overlapping and the step of joining them together comprises forming a longitudinal seam by welding arranged along one of the two opposite corrugated walls and extending between said first and second ends of said tubular body.

7. The method according to claim 1, characterized in that said step of bending comprises bending the second planar wall portions until aligning them with the first planar wall portions to form two opposite planar walls, whereby the first and second corrugated wall portions are mutually parallel and the side edges are adjacent.

8. The method according to claim 1, characterized in that said step of bending comprises two stages, wherein the first stage comprises bending the second planar wall portions until placing them at right angles with respect to the first planar wall portions, and the second stage comprises bending the second planar wall portions until aligning them with the first planar wall portions to form two opposite planar walls, whereby the first and second corrugated wall portions are mutually parallel forming a corrugated wall and the side edges are adjacent.

* * * * *